(12) United States Patent
Kim

(10) Patent No.: US 8,312,691 B2
(45) Date of Patent: Nov. 20, 2012

(54) METHOD FOR PRODUCING HEATING PANEL AND HEATING PANEL RESULTING THEREFROM

(76) Inventor: Doo Nyun Kim, Yongin-si (KR)

( * ) Notice: Subject to any disclaimer, the term of this patent is extended or adjusted under 35 U.S.C. 154(b) by 423 days.

(21) Appl. No.: 12/639,843

(22) Filed: Dec. 16, 2009

(65) Prior Publication Data
US 2010/0147503 A1 Jun. 17, 2010

(30) Foreign Application Priority Data
Dec. 16, 2008 (KR) .................. 10-2008-0127657

(51) Int. Cl.
*E04B 1/00* (2006.01)
*E04C 2/00* (2006.01)

(52) U.S. Cl. .............. 52/745.19; 52/746.1; 52/747.1; 52/506.01; 52/782.1; 52/796.1; 52/791.1

(58) Field of Classification Search ......... 52/745.19, 52/746.1, 747.1, 220.1, 745.05, 741.3, 745.06, 52/745.13, 745.2, 746.12, 782.1, 783.1, 796.1, 52/791.1, 220.8, 220.3, 404.1; 165/53, 56, 165/49, 47, 165–171, 173; 237/69, 71
See application file for complete search history.

(56) References Cited

U.S. PATENT DOCUMENTS

| | | | |
|---|---|---|---|
| 1,910,703 A * | 5/1933 | Le Grand | 52/261 |
| 3,905,203 A * | 9/1975 | Jacob | 62/272 |
| 6,182,903 B1 * | 2/2001 | Fiedrich | 237/69 |
| 6,270,016 B1 * | 8/2001 | Fiedrich | 237/69 |
| 7,939,747 B2 * | 5/2011 | Stimson et al. | 136/248 |
| 2005/0055930 A1 * | 3/2005 | Imbabi | 52/506.01 |
| 2005/0061312 A1 * | 3/2005 | Szymocha | 126/643 |
| 2008/0086981 A1 * | 4/2008 | Kilkis et al. | 52/791.1 |
| 2009/0139689 A1 * | 6/2009 | Kim | 165/49 |
| 2011/0188838 A1 * | 8/2011 | Abbott | 392/407 |

FOREIGN PATENT DOCUMENTS

| | | | |
|---|---|---|---|
| KR | 200328908 | | 9/2003 |
| KR | 2005030079 A | * | 3/2005 |
| KR | 200432475 | | 11/2006 |
| KR | 100796559 | | 1/2008 |

* cited by examiner

*Primary Examiner* — Jeanette E Chapman
(74) *Attorney, Agent, or Firm* — Christopher Paul Mitchell

(57) ABSTRACT

Method for producing a heating panel, and heating panel resulting therefrom. In a first platform, a stack of a sound-proof and moisture-proof material and a thermal insulating material, through which shock-absorbing poles having protecting caps are inserted by a predetermined interval, is prepared. A lower thermal energy storage plate is attached to the thermal insulating material in a second platform, a heat conduction steel plate is attached to the lower thermal energy storage plate in a third platform, and an upper thermal energy storage plate is attached to the heat conduction steel plate in a fourth platform. Rivet holes are perforated through the thermal energy storage plates, heat conduction steel plate, and protecting caps in a fifth platform, and rivets are into the holes in a sixth platform. The rivets are riveted in a seventh platform, completing the complex heating panel. The completed panel is transported in an eighth platform.

1 Claim, 4 Drawing Sheets

METHOD FOR PRODUCING HEATING PANEL AND HEATING PANEL RESULTING THEREFROM

RELATED APPLICATIONS

This application claims priority under 35 U.S.C. 119(e) from Korean Patent Application No. 10-2008-0127657 filed Dec. 16, 2008 in the Korean Intellectual Property Office, which is incorporated herein by reference in its entirety.

BACKGROUND

1. Technical Field

Embodiments of the present invention relate to a method for producing a multilayer complex heating panel, and a heating panel resulting therefrom.

2. Description of the Related Art

Conventionally, a floor heating system is constructed by arranging a hot water pipe over a stack of a sound-proof and moisture-proof plate and a porous synthetic resin thermal insulating material and finishing with cement mortar. However, such wet construction encounters difficulty in construction during winter and suffers from, e.g., complicated flat plastering work within a limited construction period. In addition, curing of cement mortar requires a long period of time thus increasing the required labor force, and there are also other problems, such as expensive construction costs and shortages of skilled labor.

A conventional heating system construction, in which, e.g., a sound-proof and moisture-proof material, a thermal insulating material, and a thermal energy storage material are stacked one above another, entails troublesome transportation of the respective materials. Furthermore, if there is a gap between a thermal energy storage layer and a heat conduction steel plate, deterioration in heat conductivity and heating efficiency may occur.

In particular, the above described heating system construction suffers from skilled labor shortages and requires a great period of time, entailing difficulty in efficient construction. If the construction is not completed within a predetermined period of time, it may hinder other work.

SUMMARY

Therefore, an embodiment of the present invention has been made in view of the above problems, and it is an aspect of the present invention to provide a method for producing a multilayer complex heating panel, in which a sound-proof and moisture-proof material, a thermal insulating material, and upper and lower thermal energy storage materials with a heat conduction steel plate interposed therebetween are integrally bonded and riveted to one another, whereby the multilayer complex heating panel having convenience in construction and transportation can be produced.

It is another aspect of the present invention to provide a method for producing a heating panel, in which a plurality of platforms, arranged in a line on a production line, perform only specialized operations respectively, whereby a great amount of multilayer complex heating panels can be more efficiently produced with higher operation speed and proficiency.

In accordance with an embodiment of the present invention, the above and other aspects can be accomplished by the provision of a method for producing a multilayer complex heating panel including placing a stack of a sound-proof and moisture-proof material and a thermal insulating material, through which shock-absorbing poles are inserted by a predetermined horizontal interval, on a carrier for movement of materials in a first platform arranged on a production line, aligning and attaching a lower thermal energy storage plate to an upper surface of the thermal insulating material in a second platform, aligning and attaching a heat conduction steel plate having grooves to an upper surface of the lower thermal energy storage plate in a third platform, aligning and attaching an upper thermal energy storage plate to an upper surface of the heat conduction steel plate with an interval of the grooves therebetween in a fourth platform, perforating holes for insertion of rivets through the thermal energy storage plates, heat conduction steel plate, and protecting caps of the shock-absorbing poles inserted in the thermal insulating material by use of drills of a drilling machine in a fifth platform, inserting rivets into the holes in a sixth platform by one or more operators, riveting the rivets using a riveting machine in a seventh platform, so that the rivets are fastened through the holes perforated in the heat conducting steel plate and the holes perforated in the protecting caps of the shock-absorbing poles of the thermal insulating material so as to complete the complex heating panel consisting of integrally coupled multiple layers, and transporting the completed multilayer complex heating panel using a transporter in an eighth platform.

With the method of an embodiment of the present invention, the respective platforms perform specialized operations including alignment/attachment and riveting of allotted materials as the materials are moved in a given direction along the platforms, so that multilayer complex heating panel can be successively output from the final platform. With combination of the specialized operations of the respective platforms, the high quality multilayer complex heating panels can be produced with higher efficiency.

BRIEF DESCRIPTION OF THE DRAWINGS

The above and other aspects, features and other advantages of an embodiment the present invention will be more clearly understood from the following detailed description taken in conjunction with the accompanying drawings, in which.

DETAILED DESCRIPTION

Hereinafter, an exemplary embodiment of the present invention will be described with reference to the accompanying drawings.

Figure 3:
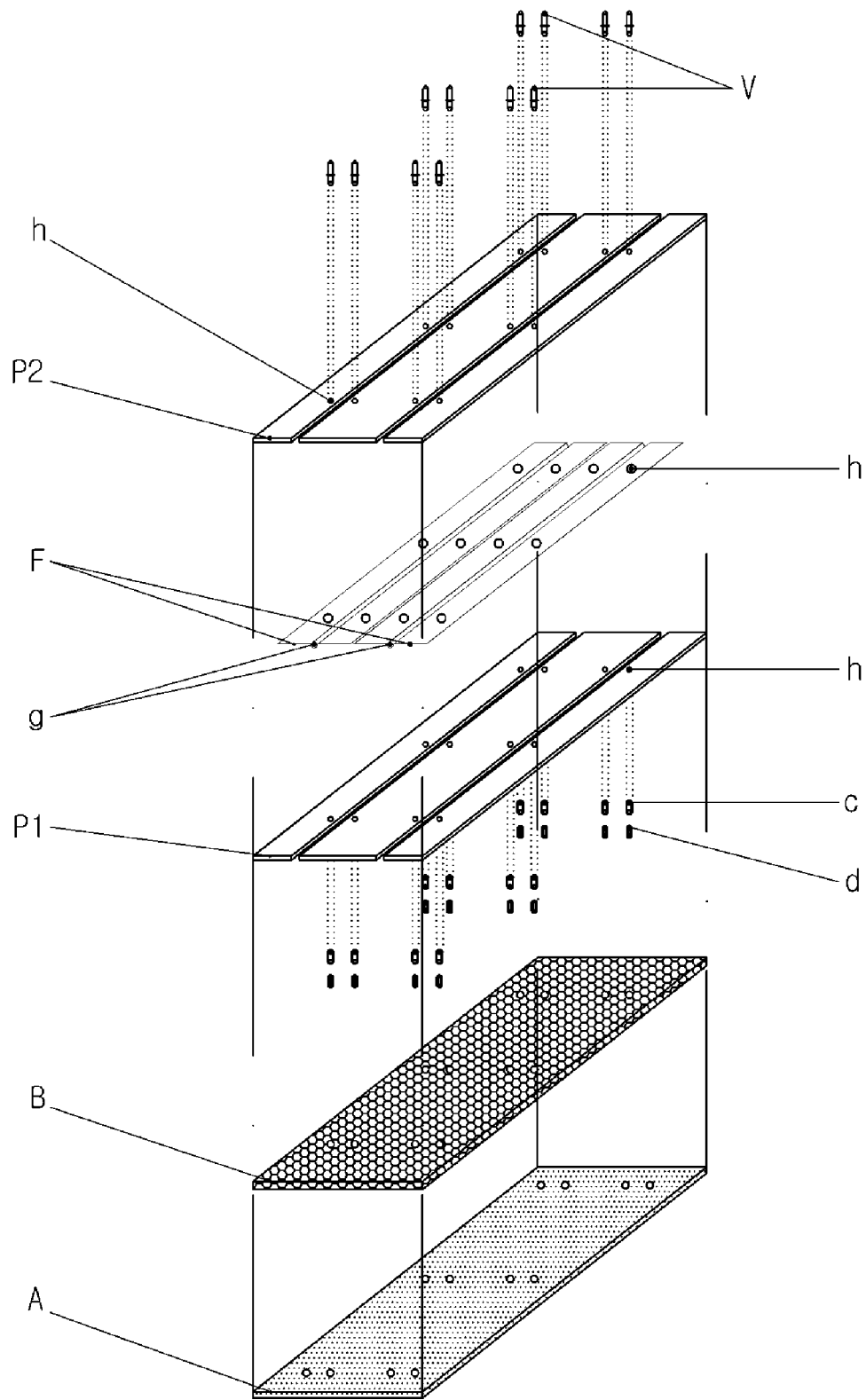
FIG. 3 is an exploded perspective view illustrating a thermal energy storage panel produced according to an exemplary embodiment the present invention.
Figure 4:
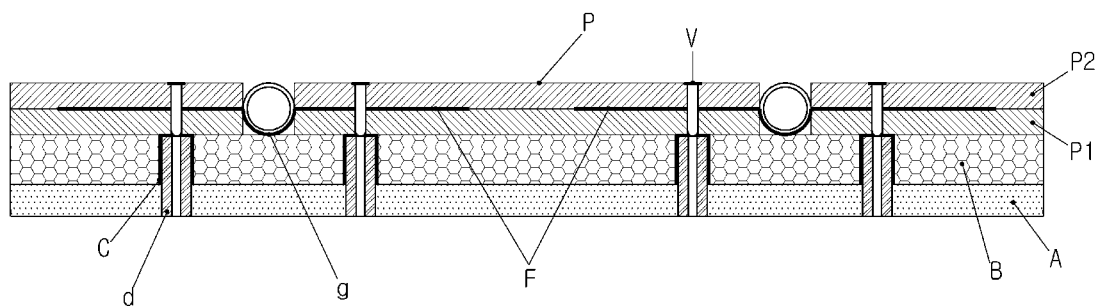
FIG. 4 is a sectional view illustrating usage of the thermal energy storage panel shown in FIG. 3.

Referring to FIGS. 3 and 4 illustrating the exemplary embodiment of the present invention, a sound-proof and moisture-proof material A and a porous synthetic resin thermal insulating material B may be stacked one above another, so as to constitute a thermal insulating layer. A plurality of shock-absorbing poles d may be inserted in the thermal insulating layer while being horizontally spaced apart from one another by a predetermined interval. The shock-absorbing poles d may have the same height as a thickness of the thermal insulating layer, and a metallic protecting cap c may be coupled to a head of each shock-absorbing pole d. Then, upper and lower thermal energy storage material plates P2 and P1 may be stacked on and bonded to upper and lower surfaces of a heat conduction steel plate F having grooves g for arrangement of hot water pipes, so as to constitute a thermal energy storage layer. The thermal energy storage layer may be stacked on the thermal insulating material B. Holes h for insertion of rivets may be perforated through the heat conduction steel plate F of the thermal energy storage layer and through an upper surface of the respective metallic protecting caps c coupled to the heads of the shock-absorbing poles d. In a state wherein rivets v may be partially inserted into the holes h, the rivets v may be riveted by a riveting machine, so that the rivets v may be penetrated through the respective holes h perforated in the heat conduction steel plate F and subsequently, may be firmly fastened into the holes perforated in the upper surface of the respective metallic protecting caps c coupled to the heads of the shock-absorbing poles p. In this way, production of the multilayer complex heating panel P may be completed.

Figure 1:
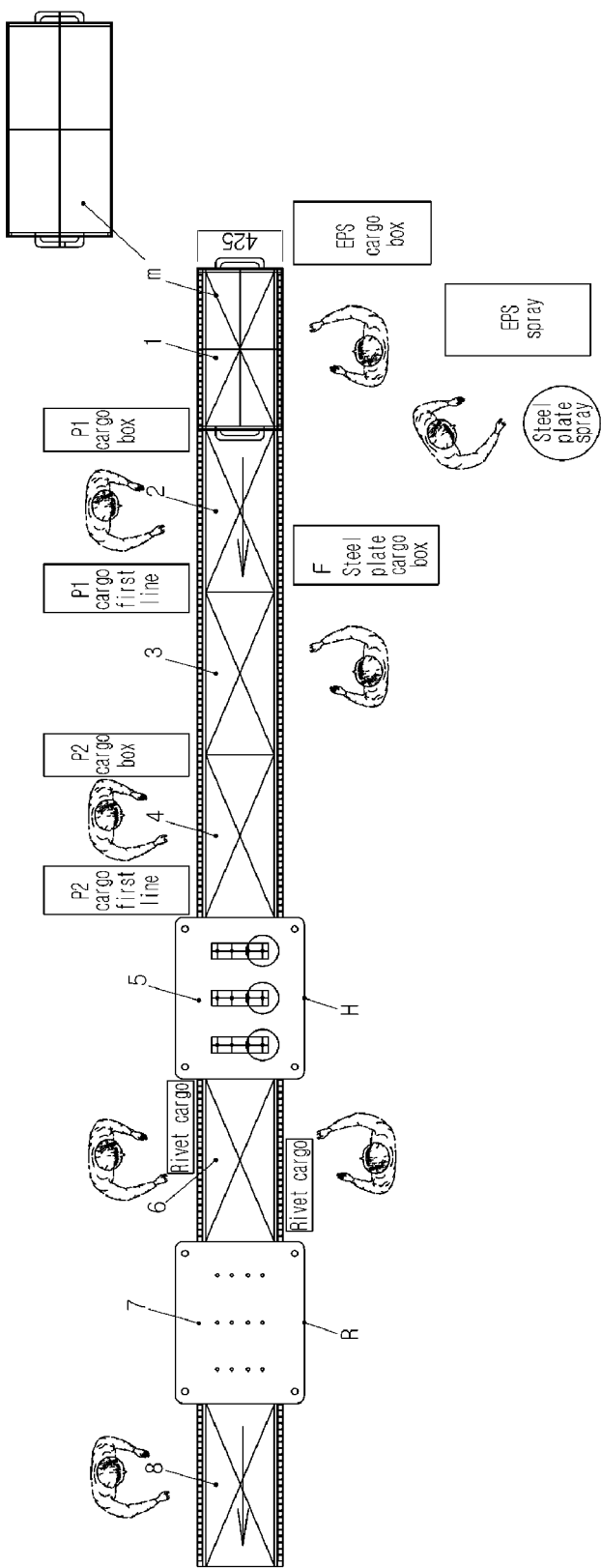
FIG. 1 is a plan view illustrating platforms arranged on a production line according to an exemplary embodiment of the present invention.
Figure 2:
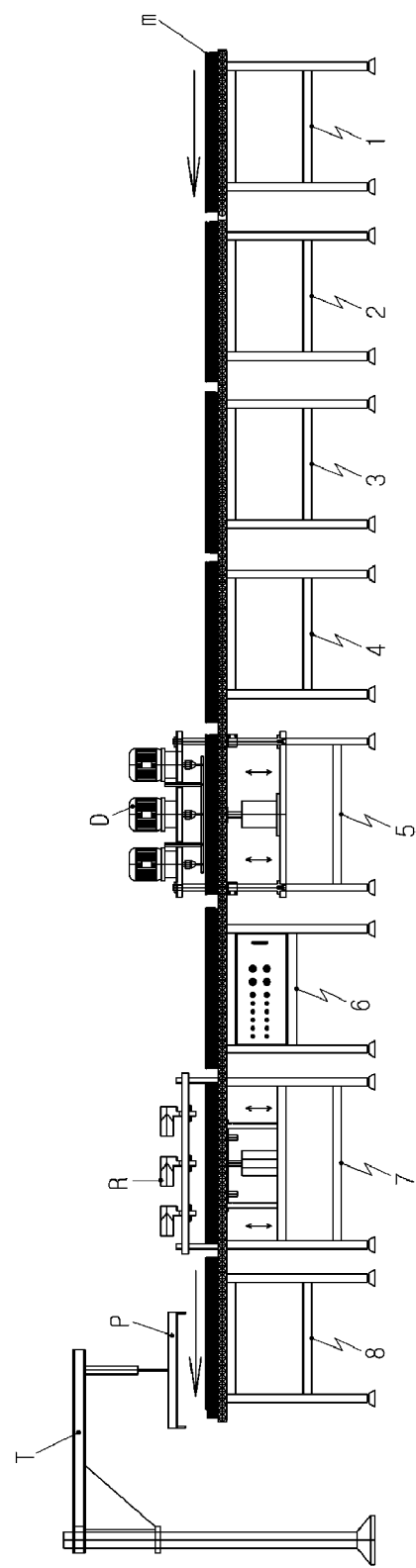
FIG. 2 is a side view of the platforms shown in FIG. 1.

FIG. 1 is a plan view illustrating a plurality of platforms arranged on a production line for the multilayer complex heating panel P according to the exemplary embodiment of the present invention. In FIG. 1, the platforms may be adapted to perform different specialized operations respectively on an object to be moved in a given direction. FIG. 2 is a side view of the platforms of the production line.

As shown in FIG. 1, an operation of spraying and applying an adhesive to materials may be separately performed at a certain position in front of a first platform 1.

A carrier m may be used to carry materials along the respective platforms of the production line for successive implementation of the specialized operations. Hereinafter, a description related to movement of the carrier m will be omitted.

In the first platform 1, the thermal insulating layer may be placed on the carrier m. The thermal insulating layer may be previously prepared by stacking the thermal insulating material B on the sound-proof and moisture-proof material A, and inserting the plurality of shock-absorbing poles d through the stacked materials A and B so that the shock-absorbing poles d are spaced apart from one another by a predetermined interval. Here, each of the shock-absorbing poles d may be provided at the head thereof with the metallic protecting cap c.

In a second platform 2, the lower thermal energy storage plate P1 may be aligned with and attached to an upper surface of the thermal insulating material B. An adhesive may have been previously applied to the material, and a description related to the application of the adhesive will be omitted hereinafter.

In a third platform 3, the heat conduction steel plate F may be aligned with and attached to an upper surface of the lower thermal energy storage plate P1 so that the steel plate F comes into close contact with the thermal energy storage plate P1.

In a fourth platform 4, the upper thermal energy storage plate P2 may be aligned with and attached to an upper surface of the heat conduction steel plate F so that the thermal energy storage plate P2 comes into close contact with the steel plate F.

In a fifth platform 5, with use of a drilling machine D, holes h for insertion of rivets may be perforated through the upper and lower thermal energy storage plate P2 and P1, heat conduction steel plate F, and upper surface of the respective metallic caps c coupled to the heads of the shock-absorbing poles d. In this case, the size and horizontal interval of the holes h may be determined based on the size and preset interval of drills provided in the machine and thus, an automated drilling operation may be possible. The drilling operation may be controlled to prevent the holes h from being perforated at positions except for the heat conduction steel plate F and to assure that the holes h are accurately aligned with the shock-absorbing poles d arranged in a predetermined pattern.

In a sixth platform 6, the rivets v may be partially inserted into the perforated holes h. Since the insertion of the rivets may require a longer time than other operations, it may be desirable that one or more operators work together to balance working speed relative to neighboring platforms.

In a seventh platform 7, the rivets v inserted in the holes h may be compressed and riveted by a riveting machine R. In this case, the rivets v may be penetrated through the holes h perforated in the high strength heat conducting steel plate F and subsequently, may be fastened into the holes perforated in the upper surface of the respective metallic protecting caps c coupled to the heads of the shock-absorbing poles p. In this way, the complex heating panel P, in which multiple layers may be integrally firmly coupled to one another, may be completed.

In an eighth platform 8, the completed multilayer complex heating panel P may be transported by a transporter T.

As apparent from the above description, an embodiment of the present invention provides the following effects.

Firstly, a multilayer complex heating panel may be produced via specialized stacking operations of different materials and combination of the specialized operations using a plurality of platforms arranged on a production line. This may allow each platform to perform a designated operation, assuring higher operation speed and proficiency and consequently, enabling highly efficient mass production of high quality heating panels.

Secondly, rivets may be firmly fastened in the multilayer complex heating panel through holes perforated in a heat conduction steel plate and an upper surface of respective metallic protecting caps coupled to shock-absorbing poles. This may prevent a part of the multilayer heating panel from being peeled off during transportation and construction thereof.

Thirdly, the heating panel may be conveniently spread on a flat floor without using cement mortar, adhesive, etc. at a construction site, so that a hot water pipe and a finishing material may be constructed thereupon. This may allow even an unskilled operator to construct the heating panel and considerably reduce a construction period of time so as not to hinder other work.

Fourthly, since cement mortar, adhesive, etc. may not be used at a construction site, the heating panel may be used immediately after construction thereof and may prevent environmental contamination due to evaporation of an adhesive solvent. Further, since multiple layers of the heating panel may come into close contact with one another without gaps, it may be possible to achieve improved storage efficiency and conduction of heat emitted from a hot water pipe and consequently, to achieve excellent heating effects.

Although the preferred embodiment of the present invention has been disclosed for illustrative purposes, those skilled in the art will appreciate that various modifications, additions and substitutions are possible, without departing from the scope and spirit of the invention as disclosed in the accompanying claims and their equivalents.

What is claimed is:

1. A method for producing a multilayer complex heating panel comprising:
    placing a stack of a sound-proof and moisture-proof material and a porous synthetic resin thermal insulating material, through which a plurality of shock-absorbing poles, having metallic protecting caps respectively provided at heads thereof, is inserted by a predetermined horizontal interval, on a carrier in a first platform, the carrier being adapted to move platforms successively arranged on a production line;

aligning and attaching a lower thermal energy storage plate to an upper surface of the thermal insulating material in a second platform;

aligning and attaching a heat conduction steel plate to an upper surface of the lower thermal energy storage plate in a third platform;

aligning and attaching an upper thermal energy storage plate to an upper surface of the heat conduction steel plate in a fourth platform;

perforating holes for insertion of rivets through the upper and lower thermal energy storage plates, heat conduction steel plate, and an upper surface of the respective metallic protecting caps coupled to the heads of the shock-absorbing poles by use of drills of a drilling machine in a fifth platform;

inserting rivets into the holes in a sixth platform;

riveting the rivets using a riveting machine in a seventh platform, so that the rivets are fastened through the holes perforated in the heat conducting steel plate and the holes perforated in the upper surface of the respective metallic protecting caps of the shock-absorbing poles so as to complete the complex heating panel consisting of integrally coupled multiple layers; and transporting the completed multilayer complex heating panel using a transporter in an eighth platform.

* * * * *